United States Patent Office 3,577,525
Patented May 4, 1971

3,577,525
ADENOVIRUS VACCINE AGAINST CANINE HEPATITIS
James A. Baker, Ithaca, N.Y., assignor to Cornell Research Foundation, Inc., Ithaca, N.Y.
No Drawing. Original application July 1, 1964, Ser. No. 379,744, now Patent No. 3,346,456, dated Oct. 10, 1967. Divided and this application Aug. 15, 1967, Ser. No. 660,616
Int. Cl. C12k 71/00
U.S. Cl. 424—89  1 Claim

ABSTRACT OF THE DISCLOSURE

A method of protecting a dog against infectious canine hepatitis by inoculation of the dog with live adenovirus alien to the dog.

---

The present invention relates to a new concept in biological engineering. More specifically, the invention relates to a method of making an animal resistant to pathogens caused, for example, by infectious virus or bacteria to which the animal is susceptible, by the use of a heterotypic, immunologically unrelated pathogen alien to the animal. The present invention is thus directed to the use of infectious material from one animal species for protection against disease in another animal species.

This application is a divisional continuation application of patent application 379,744 filed July 1, 1964. Said latter patent application combining the subject matter of patent application 156,488 filed Dec. 1, 1961 and patent application 170,500 filed Feb. 1, 1962 (both now abandoned). Both patent applications 156,488 and 170,500 were each continuation-in-part applications of patent application 57,639, filed Sept. 22, 1960 (now abandoned) all filed by the same applicant, James A. Baker, as the present application.

The use of cowpox virus to protect people against smallpox virus by Jenner in 1798 was the first example of the use of one virus to protect against another virus. These "pox" viruses, however, have been reported to be immunologically related as sera from vaccinated individuals neutralized smallpox virus and sera from alastrim patients neutralized viruses of cowpox, smallpox and vaccinia. Since Jenner, many vaccines have been developed, but always by use of homologous virus or bacteria inactivated or altered in virulence. See the co-pending application of James A. Baker, Ser. No. 156,487, filed Dec. 1, 1961. Immunity in all cases was signalized by appearance of antibodies and a vaccine was considered to be immunologically potent only after sera from inoculated individuals showed substantial amounts of neutralizing antibodies for the homologous virus or bacteria.

In investigations in this field with virus diarrhea virus, a disease of cattle, and hog cholera virus, a disease of pigs, it was discovered that live virus diarrhea virus protects pigs against lethal doses of hog cholera virus. This was unexpected as these viruses are immunologically unrelated in that there is no cross neutralization, i.e. the inoculation of the pigs with the virus diarrhea virus produces no neutralizing antibodies against hog cholera virus. The protection provided by the hetero-typic virus diarrhea virus against hog cholera virus thus has no direct immunological basis.

The induced resistance or altered susceptibility is apparently due to the fact that pigs inoculated with virus diarrhea virus create protection by developing hog cholera antibodies very quickly after inoculation with hog cholera virus, as compared to controls, who received no virus diarrhea virus, and who developed no hog cholera antibodies after receiving the lethal hog cholera virus inoculation. The advantages of using virus diarrhea virus, a virus which is alien to the pig, i.e. it produces no signs of illness in pigs, as a means for making pigs resistant to hog cholera virus, an infectious virus to which the pig is highly susceptible, are readily apparent. The teachings of the present invention also include an improved method for producing hyper-immune hog cholera serum calling for an inoculation with virus diarrhea virus followed by an inoculation with hog cholera virus.

In continued investigations it was also discovered that live adenovirus protects dogs against the immunologically distinct and unrelated infectious canine hepatitis virus. As with the virus diarrhea virus in pigs, inoculation with adenovirus, a virus which is alien to the dog, produced no signs of illness in the dogs. Also, inoculation of dogs with the adenovirus produced no neutralizing antibodies against infectious canine hepatitis virus. Here again, the induced resistance is apparently due to the fact that dogs inoculated with adenovirus create protection by developing canine hepatitis antibodies very quickly after inoculation with canine hepatitis virus.

Investigations have shown that it is essential that the hetero-typic or alien pathogen, e.g. virus or bacteria, used to make the animal resistant to the infectious immunologically unrelated pathogen, develop in the animal complement-fixing antibodies (but no significant neutralizing antibodies) against the infectious immunologically unrelated pathogen. This (or the positive gel diffusion test) is the critical indicator which shows that the hetero-typic pathogen, although alien to the animal, will make the animal resistant to the infectious immunologically unrelated pathogen. It is also essential that the hetero-typic or alien pathogen develop both complement-fixing and neutralizing antibodies against the hetero-typic or alien pathogen. It is further essential that the hetero-typic pathogen used to make the animal resistant to the infectious pathogen (a) produce no signs of illness in the animal, i.e. be alien to the animal, and (b) develop no or only negligible neutralizing antibodies against the infectious pathogen, i.e. be immunologically unrelated to the infectious pathogen. These factors, noted above, are inter-related and investigations have demonstrated that an alien pathogen, which develops complement-fixing antibodies in the animal against an immunologically unrelated pathogen, will make the animal resistant to the immunologically unrelated pathogen.

Investigations have also shown that one of the outstanding advantages of the present invention is that the animal inoculated with the alien pathogen and then with the immunologically unrelated pathogen, does not spread either pathogen to other animals. Pigs, for example, exposed by contact to pigs inoculated with virus diarrhea virus and then with hog cholera virus, showed no titer of either virus or any signs of illness. This differs materially from the use of homologous vaccines where the inoculated animal is a source of infection for other animals. There is always risk, for example, that hog cholera may spread to susceptible pigs from pigs inoculated with live hog cholera virus vaccine.

The alien pathogen used to make the animal resistant should be live as desired immunization is not obtainable employing inactivated pathogens. Live pathogens which have been modified or attenuated can be used as well as the so-called native or virulent strains. For making the pig resistant to hog cholera, for example, any of the live virus diarrhea viruses such as disclosed hereinafter with respect to the virus diarrhea virus method for producing hyper-immune hog cholera serum (and the noted publications) can be used. Injection of the live pathogens into the animal can be by conventional inoculating procedures including subcutaneously, intramuscularly, etc.

The following examples will serve to illustrate the invention.

EXAMPLE I

Live virus diarrhea virus from the spleen of a Hereford calf was grown in tissue cultured embryonic bovine kidney cells as described by Gillespie et al., The Cornell Veterinarian, 50, 73–79 (1960). One ml. of the tissue culture fluid from the first passage was injected intramuscularly into pigs. The pigs were subsequently challenged with virulent hog cholera virus. All of the pigs lived. Control pigs which had not been immunized with the virus diarrhea virus died of hog chlorea as a result of inoculation with the virulent hog cholera virus.

EXAMPLE II

Example I was repeated but the live virus diarrhea virus employed was one which had been passed seven times through tissue culture as described in Gillespie et al., supra. Pigs were inoculated intramuscularly with 1 ml. of the undiluted tissue culture. All of the pigs were immune to hog cholera upon challenge with virulent hog cholera virus.

EXAMPLE III

Example II was repeated utilizing live virus diarrhea virus which had been serially passed eleven times through tissue culture at 2-day intervals in the manner described in Gillespie et al., supra. Pigs inoculated with 1 ml. of the virus obtained from the eleventh passage proved to be immune when challenged with virulent hog cholera virus.

EXAMPLE IV

Litters of pigs about 8 weeks of age and obtained from a disease-free herd were divided into three groups. Group (1) was inoculated with 1 ml. of a 10% spleen emulsion prepared from a calf infected with the New York 1 virulent strain of virus diarrhea virus, group (2) was inoculated with 1 ml. of tissue culture obtained after nine serial passages of the Oregon C 24V strain of virus diarrhea virus, and group (3) was retained as controls. No signs of illness were noted in any pig inoculated with the live virus diarrhea virus whether of spleen or of tissue-cultured origin. Littermate controls exposed by contact also showed no signs of illness. After 4 weeks the pigs in all groups were inoculated with 1 ml. of a spleen emulsion prepared from a pig infected with strain A virulent hog cholera virus. After the inoculation with hog chlorea virus all pigs showed a temperature elevation two to four days after inoculation. In the control pigs that had not been inoculated with virus diarrhea virus, the temperatures remained elevated and the pigs died from 8–15 days after inoculation. In contrast, the pigs initially given virus diarrhea virus showed a temperature elevation of lesser degree that lasted for only 1 to 2 days, after which the temperature returned to the normal range, the pigs continued to eat and showed no other signs of illness. The pigs given virus diarrhea virus developed an average neutralizing antibody titer of 27 against this virus 28 days after inoculation but no titer (neutralizing antibodies) against hog cholera virus. After inoculation with hog cholera virus the pigs that had been given virus diarrhea virus initially, showed the presence of hog cholera antibodies 7 days after inoculation and 21 days afterwards the average titer was 515. After the inoculation with hog cholera virus the titer against virus diarrhea virus also increased from 27 to 729 and paralleled the accelerated development of the titer against hog cholera virus. In contrast, in the control pigs no antibodies developed against hog cholera virus or virus diarrhea virus before they died.

EXAMPLE V

Litters of purebred beagle puppies about 4 to 8 months of age and known to be susceptible to infectious canine hepatitis were divided into two groups with littermates in each group. Group (1) was inoculated subcutaneously with 1 ml. of live adenovirus type 4 and group (2) was left uninoculated as controls. After this inoculation, no signs of illness were observed in any of the dogs including the inoculated dogs and the uninoculated control dogs exposed by contact to the inoculated dogs. After 5 weeks all of the dogs were given 1 ml. of a suspension of Cornell strain 1 infectious canine hepatitis virus intravenously Following inoculation with infectious canine hepatitis all dogs showed increased temperatures, the temperatures of the controls remaining elevated for longer periods of time than the temperatures of the dogs initially inoculated with adenovirus. After the inoculation with infectious canine hepatitis, all the dogs also showed viremia (virus in the blood) on the day after inoculation. The control dogs inoculated with only infectious canine hepatitis showed viremia lasting from 4 to 6 days with the development of corneal opacities in the majority of the dogs. In contrast, the dogs that had been given adenovirus and then infectious canine hepatitis virus showed viremia only on the first day following inoculation with no observable corneal opacities. All the dogs initially inoculated with adenovirus and then inoculated with infectious canine hepatitis virus showed neutralizing antibodies against infectious canine hepatitis virus 2 days after the last inoculation. In contrast, the control dogs receiving infectious canine hepatitis only did not develop neutralizing antibodies until 4–6 days after inoculation.

In a similar manner to that described above, the following animals can be protected against infectious pathogens to which they are susceptible, by resistance created by the specified heterotypic pathogens alien to the animal. In all instances the heterotypic pathogen develops complement-fixing antibodies against the immunologically unrelated infectious pathogen.

EXAMPLE VI

Inoculation of a horse with the live heterotypic virus, bovine rhinotracheitis, alien to the horse, protects the horse against infectious equine rhinopneumonitis.

EXAMPLE VII

Inoculation of a cat with the live heterotypic virus, *Miyagawanella bovis*, alien to the cat, protects the cat against infectious *Miyagawanella felis*.

EXAMPLE VIII

Inoculation of a dog with live *Leptospira pomona* protects the dog against infectious *Leptospira canicola*. This is an example of the use of a heterotypic bacteria, alien to the host to provide protection against an immunological distinct bacteria infectious to the host.

EXAMPLE IX

Cows were inoculated with a commercial hog cholera modified live virus (attenuated by over 150 passages in rabbits). The cows proved to be immune when challenged with virulent virus diarrhea virus.

EXAMPLE X

Litters of purebred beagles were divided into two groups. Group (1) was inoculated intravenously with 1 ml. of tissue cultured live measles virus, Edmonston strain, Enders et al., Proc. Soc. Exp. Biol. and Med. 86, 277 (1954), and group (2) was retained as controls. All dogs given the measles virus remained well and developed no rash. Twenty-four to twenty-eight days later all dogs were inoculated intravenously with 1 ml. of a 10% suspension of spleen containing the Snyder Hill strain of canine distemper virus. The dogs inoculated initially with the measles virus showed no signs of illness. In contrast, the control dogs showed typical signs of distemper infection, with a diphasic temperature curve and catarrhal signs.

Investigations, as illustrated by the above examples, show that the heterotypic pathogen, alien to the animal behaves as antigen in that it promotes resistance or secondary response to the infectious immunologically unrelated pathogen. In other words, the heterotypic pathogen promotes resistance or a secondary response which resembles the effect induced by a single inoculation of homologous inactivated pathogen. As noted above, an animal in a state of resistance to a pathogen, produces neutralizing antibodies at an accelerated rate when exposed to this pathogen. The time interval from secondary response to primary response or immunity is thus reduced. Regardless of the exact modus operandi, the net result of this, as noted in the illustrative examples, is that illness may not occur or else will be less severe.

As set forth hereinabove, the teachings of the present invention also include an improved method for producing hyper-immune hog cholera serum calling for the inoculation of a pig with virus diarrhea virus followed by inoculation of the same pig with hog cholera virus.

The use of hyper-immune hog cholera serum in the serum-virus combination for vaccination, and the use of the hyper-immune serum per se for controlling epidemics of hog cholera, are both well-known. While the hyper-immune serum is thus recognized as an important veterinary tool in this field, the use of the serum, however, has been limited by its method of preparation. In the past, for example, the hyper-immune serum has been prepared by the following general procedure. Pig A is first immunized by a combined serum-virus injection. Viremia usually develops within two weeks after inoculation, followed shortly by clearance of the virus from the blood as the pig develops immunity due to the production of antibodies. Another pig, pig B, is inoculated with a lethal dose of virulent, unmodified hog cholera virus. Before pig B dies, e.g. when pig B is moribund, pig B is bled and the blood containing a high concentration of the virulent virus is intravenously injected into immunized pig A at a ratio of about 5 ml. of blood per pound of pig A. If the immunized pigs (pig A) used in this procedure weigh about 300 lbs., this calls for the injection of about 1500 ml. of the virus containing blood per pig. After pig A develops a large amount of antibodies due to the injection of the virus containing blood, pig A is bled and the resulting hyper-immunized blood is then converted to serum with the desired high titer in accordance with standard practices in the art.

The above procedure for obtaining hyper-immune serum calls for immunizing pig A with live virus and the inoculation of pig B with live virus. As pig B is lost, i.e. dies, and cannot be used for food, this procedure, when carried out in large scale operations, is obviously objectionable for economic reasons. This procedure is also objectionable as sick pig B provides a serious source of infection to untreated, non-immune pigs. In addition, this procedure is objectionable due to the relatively large amounts of virus containing blood injected into immunized pig A.

In investigations in this field, searching for an improved process of preparing hyper-immune hog cholera serum, it was discovered that blood, from which the desired high titer hog cholera serum can be prepared by conventional means, can be readily formed in a pig by first inoculating the pig with virus diarrhea virus and then inoculating the pig inoculated with virus diarrhea virus with hog cholera virus. The virus diarrhea virus, unlike hog cholera virus, produces no temperature rise or other signs of illness in the pig, and tests have shown that the virus diarrhea virus is not transmitted by the inoculated pig to other pigs.

The virus diarrhea virus used in the improved procedure of the present invention can be unmodified virus such as obtained from the spleen of a calf infected with virus diarrhea virus, Baker, James A., York, Charles J. Gillespie, James H. and Mitchell, Grayson B., Am. J. Vet. Res., 15, 525–531 (1954); or virus diarrhea virus propagated in tissue culture, Lee, K. M. and Gillespie, J. H., Am. J. Vet. Res., 18, 952–953 (1957); or modified or attenuated virus diarrhea virus obtained, for example, by passage through rabbits, Baker, James A., Gillespie, James H., Sheffy, Ben E. and Marshall, Vincent, The Cornell Veterinarian, 48, No. 2, 207–213 (1958). All strains of virus diarrhea virus have been found to have antigenic relationship when compared by the neutralization test, and can be used in the present invention. Representatives strains, including the cytopathogenic strains, for use in the present invention, are noted in the above and following publications. The Cornell Veterinarian: Gillespie, James H. and Baker, James A., 49, 439–442 (1959); Gillespie, James H., Baker, James A. and McEntee, Kenneth, 50, 73–79, (1960) Robson, Douglas S., Gillespie, James H. and Baker, James A., 50, 503–509 (1960); Gillespie, James H., Coggins, Leroy, Thompson, Joan and Baker, James A., 51, 155–159 (1961).

The hog cholera virus used in the improved process of the present invention can be unmodified virulent virus maintained by serial passage through pigs, attenuated virus which reverts to the virulent state, Baker, James A. and Sheffy, Ben E., Proc. Soc. Exp. Biol. and Med., 105, 675–678 (1960); or virus propagated in tissue culture, Gillespie, James H., Sheffy, Ben E. and Baker, James A., Proc. Soc. Exp. Biol. and Med., 105, 679–681 (1960); or virus which has been attenuated by passage through other animals such as the rabbit. See U. S. Patent No. 2,518,978.

The following examples will serve to illustrate the present invention as it relates to serum.

EXAMPLE XI

A pig, about 180 pounds, is first inoculated (intramuscularly) with 1 ml. of a 10% spleen emulsion prepared from a calf infected with New York 1 virus diarrhea virus. This inoculation produced no temperature rise or other signs of illness in the pig. After two weeks the pig was inoculated intramuscularly with 1 ml. of a 10% spleen emulsion of strain A virulent hog cholera virus. This inoculation, e.g. in about 2–4 days, produced a slight elevation in temperature, i.e. about 1° F., for about 1–2 days, after which the temperature returned to and remained normal. After the inoculation with hog cholera virus, hog cholera antibodies were found to be present 7 days after this inoculation, and after 21 days the average titer was found to be 515. Also, after the inoculation with hog cholera virus, the titer against virus diarrhea virus increased from 27 to about 729 and paralleled the development of the titer against hog cholera virus. At this time the pig was bled and the blood converted to the desired hyper-immune serum in accordance with standard practices in the art.

EXAMPLE XII

This example follows the general procedure of Example XI, except that the pig is inoculated with 1 ml. of a 10% spleen emulsion prepared from a calf infected with Orgeon C 24V virus diarrhea virus, and this is followed in about 10–14 days by an inoculation of a tissue culture of strain A virulent hog cholera virus. The hyper-immunized pig is then bled on or about the 14th day after the inoculation with the hog cholera virus.

EXAMPLE XIII

This example follows the procedure of Example XII, except that the pig is inoculated with a tissue culture of New York 1 virus diarrhea virus.

EXAMPLE XIV

This example is in accordance with Example XI, except that non-virulent, attenuated virus diarrhea virus is used for the first inoculation and non-virulent, attenuated hog cholera virus is used for the second inoculation.

Why the inoculation of virus diarrhea virus in pigs induces resistance against the immunologically unrelated hog cholera virus is not fully understood. It has no direct immunological basis. This can be illustrated by the fact that the pigs inoculated with virus diarrhea virus developed antibody titer against virus diarrhea virus, as noted above, but no measurable titer against hog cholera virus prior to inoculation with hog cholera virus. Investigations, however, have shown that the induced resistance or altered susceptibility is apparently due to the fact that the pigs inoculated with virus diarrhea virus and then with hog cholera virus, create protection by developing hog cholera antibodies very quickly, e.g. within 7 days, after inoculation with hog cholera virus. On the other hand, in the control pigs, receiving no virus diarrhea virus inoculation and who died within 8–15 days after receiving a lethal hog cholera inoculation, no antibodies developed against hog cholera virus. Failure of the virus diarrhea virus and the hog cholera virus to share a common neutralizing antibody also indicates that a new mechanism must be operating. One possible explanation is that the virus diarrhea virus behaves as antigen by promoting a secondary response in the pig. Regardless of the exact modus operandi, investigations have demonstrated that the virus diarrhea virus protects pigs against lethal doses of hog cholera virus, and that pigs inoculated with virus diarrhea virus and then inoculated with hog cholera virus, develop antibodies against hog cholera virus much earlier and in higher concentration more quickly than is encountered in the usual antibody response to hog cholera virus. As the present invention thus provides means for developing a high titer of hog cholera antibodies in the blood of a pig, it also inherently provides for immunization of the pig against hog cholera virus.

The advantages of the process of the present serum invention which calls for only one inoculation of live hog cholera virus per pig and eliminates the requirement for the use of virus containing blood from a pig inoculated with a lethal dose of hog cholera virus, will be readily apparent to those skilled in the art. These advantages can be obtained by use of native (unmodified), or near native, live virulent viruses, such as used in Example XI, by the use of modified virus diarrhea virus with native hog cholera virus, by the use of native virus diarrhea virus with modified hog cholera virus, or, where the use of live virulent virus is contraindicated, by the use of non-virulent modified virus, such as used in Example XIV. In all cases, for best overall results, the hog cholera inoculation should be given not less than 7 days and preferably about two weeks, after the inoculation with the virus diarrhea virus. Optimum times, however, for any particular virus combination, can be readily ascertained by preliminary test.

What is claimed is:

1. The method of reducing the time interval from secondary response to primary response or of inducing increased resistance or secondary response in a dog against infectious canine hepatitis which comprises selecting a canine which is not immunized against infectious canine hepatitis, said dog being potentially susceptible to Cornell's strain 1 of infectious canine hepatitis, inoculating said dog with live adenovirus, said adenovirus being immunologically unrelated to the said infectious canine hepatitis virus in that the inoculation with adenovirus produces canine hepatitis complement-fixing antibodies with no observable corneal opacities and no neutralizing antibodies against infectious canine hepatitis virus, in the absence of subsequent inoculation with infectious canine hepatitis virus, said adenovirus being alien to said dog, said dog thereby producing effective amounts of neutralizing antibodies against infectious canine hepatitis at an accelerated rate when thereafter exposed to infectious canine hepatitis virus.

References Cited

Kapsenberg P.S.E.B.M. 101(4): 611–614 August–September 1959, "Relationship of Infectious Canine Hepatitis Virus to Human Adenovirus."

Sinha et al. J.A.V.M.A. 136(10): 481–485 May 15, 1960, "Role of Animals in Relation to Human Viral Diseases."

Heller et al. Virology 11(3): 640–645 July 1960, "One-Sided Immunologic Relation Between Adenovirus and Infectious Canine Hepatitis Antigens."

Carmichael et al. P.S.E.B.M. 107(1): 214–218 May 1961, "Serological Comparisons Between Infectious Canine Hepatitis Virus and Human Adenovirus Types."

Carmichael et al. P.S.E.B.M. 109(1): 75–79 January 1962, "Secondary Serological Response to Infectious Canine Hepatitis Virus Produced by Adenovirus Type 4."

Carmichael et al. P.S.E.B.M. 110(4): 756–758 August–September 1962, "Human Adenovirus Complement-Fixing Antibodies in New York Family Dogs."

SHEP K. ROSE, Primary Examiner